THIN FILM REGISTER FORMING AN ALTERNATELY STAGGERED ARRAY

Filed July 15, 1966 2 Sheets-Sheet 1

INVENTOR.
ANDRE A. JAECKLIN
BY Robert G. Clay
ATTORNEY

Oct. 21, 1969 A. A. JAECKLIN 3,474,425

THIN FILM REGISTER FORMING AN ALTERNATELY STAGGERED ARRAY

Filed July 15, 1966 2 Sheets-Sheet 2

INVENTOR.
ANDRE A. JAECKLIN

BY Robert G. Clay

ATTORNEY

United States Patent Office 3,474,425
Patented Oct. 21, 1969

3,474,425
THIN FILM REGISTER FORMING AN ALTERNATELY STAGGERED ARRAY

Andre A. Jaecklin, Palo Alto, Calif., assignor to Ampex Corporation, Redwood City, Calif., a corporation of California Filed July 15, 1966, Ser. No. 565,623
Int. Cl. G11b 5/00
U.S. Cl. 340—174 8 Claims

ABSTRACT OF THE DISCLOSURE

Improved geometry for a magnetic thin film memory of the type having a staggered magnetic domain site configuration, the geometry providing individual and isolated magnetic sites having sides which are slanted at an angle $\alpha$ shallower than a maximum practical angle. Angle $\alpha$ is chosen commensurate with the site shape and geometrical dimensions, overlap with adjacent staggered sites, and thickness and type of the magnetic material. The angle $\alpha$ thus is chosen to define a site finite area and shape capable of containing a magnetic domain which exhibits minimized magnetostatic energy and thus minimized demagnetization effects.

The present invention relates to a thin film memory device, and more particularly to improved and specific geometry for a magnetic thin film memory and/or a shift register, which geometry prevents the formation of zig-zag walls in the magnetic domains stored in the memory at various critical points of the geometry.

Considerable interest for thin film memories is being shown in industry primarily due to the fact that such memories lend themselves to easy fabrication and accordingly, a potentially inexpensive memory system. Each storage cell or element of such a system is formed of an individual spot or site of magnetic material, where the direction of magnetization of the material represents the information stored therein. The storage cells or elements are accessed by means of, for example, a flat, thin film current conducting strip which is placed in close proximity to the element of magnetic material, wherein a current pulse applied to the conducting strip produces the desired local field. In one such thin film memory system, the elements representing individual storage cells are joined to form a continuous chain of magnetic film elements or sites. Magnetic domains each having approximately the size of one cell are propagated along this chain of sites by means of a selected array of the thin film conducting strips. A thin film memory exemplifying the configuration and operation of such memory systems is described in the copending U.S. patent applications, Ser. Nos. 387,426 now Patent No. 3,427,603 and 387,427 now Patent No. 3,417,385 both filed on Aug. 4,1964, and Ser. No. 508,108, filed on Nov. 16, 1965 in the names of Irving Wolf and Andre Jaecklin, Irving Wolf, and Irving Wolf and Andre Jaecklin respectively.

The boundary or walls of magnetic domains which are created in a continuous magnetic film strip as well as in a continuous succession of the magnetic storage sites previously mentioned, generally exhibit jagged edges or borders hereinafter termed zig-zag walls. Because the total width of a zig-zag wall is poorly-defined and in the worst cases is hard to predict, a severe limitation is generally imposed if a high-packing density is desired for the memory system. The formation of the so-called zig-zag walls is due to the phenomenon wherein a domain wall, extending in parallel relation to the hard axis of a magnetic film medium such as permalloy, cannot exist, because its magnetostatic energy is very high and it is the tendency of a magnetic domain to minimize its total energy. Accordingly, the zig-zag wall is formed when the domain wall breaks up into a number of segments when attempting to lower its magnetostatic energy at the expense of domain wall energy.

Accordingly, it is an object of the present invention to provide a thin film shift register or memory system having magnetic storage elements or sites of improved configuration which are physically as well as magnetically isolated from one another.

It is another object of the invention to provide a thin film shift register or memory system having magnetic storage elements or sites of improved geometry to preclude the formation of zig-zag walls in the magnetic domains stored therein, and to allow a relatively higher packing density than heretofore possible.

It is another object of the invention to provide a thin film register or memory system formed of a plurality of magnetic film storage sites having an improved geometry, wherein the boundary or sides of the sites are disposed at preselected angles relative to the easy axis of the magnetic film medium.

Additional objects and advantages will be apparent from the specification taken in conjunction with the drawings in which.

Figure 1:
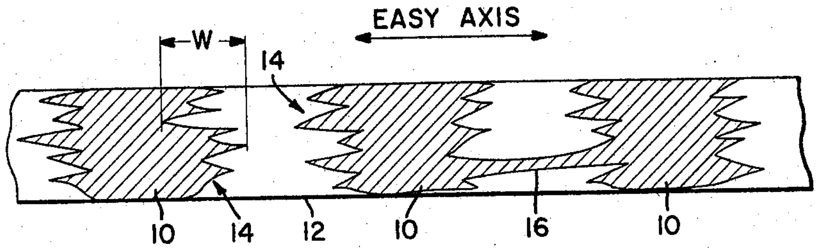
FIGURE 1 is a pictorial view of a series of consecutive magnetic domains formed in a straight strip of magnetic storage medium in the manner and configuration commonly utilized in prior art devices.

Referring to FIGURE 1, it is well known in the art that a domain wall, of a magnetic domain 10, which extends parallel to the hard axis cannot exist in a thin magnetic film 12, such as the type of film formed of for example, Permalloy. In an attempt to lower its own magnetostatic energy the wall breaks up into a number of segments to thus form a so-called zig-zag wall 14, such as herein shown in FIGURE 1. The width W of the zig-zag wall 14 is by its nature poorly defined. It is furthermore highly dependent on local variations of the properties of the magnetic film 12. This is a disturbing effect for shift registers which operate on the theory of controlled domain wall motion within a magnetic film. As seen in FIGURE 1, misinformation exists whenever the domain walls 14 of adjacent domains 10 are not sufficiently confined to certain prescribed paths, and adjacent domain boundaries extend to one another to form a bridge therebetween as indicated by numeral 16. Thus it is apparent that the domains in straight-line prior art memory systems must be sufficiently spaced apart to allow the formation of the zig-zag wall 14 of width W without allowing the walls of adjacent domain to span therebetween. It follows therefore, that higher packing densities for a practical shift register or memory system are precluded by the prior art straight-line magnetic domain storage configurations.

Figure 2:
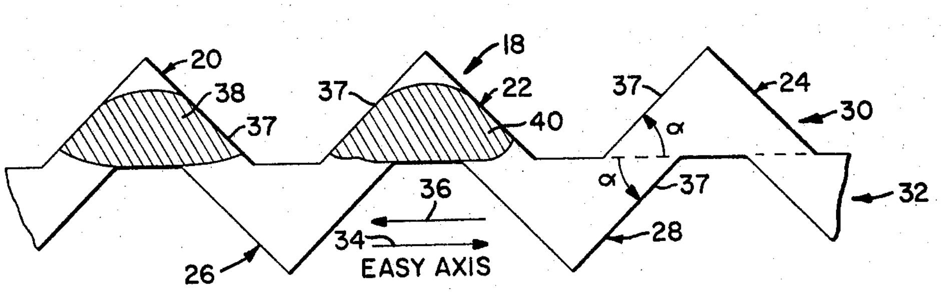
FIGURE 2 is a pictorial view of consecutive magnetic domains stored in a zig-zag memory of magnetic medium storage sites such as employed in the present invention.
Figure 3:
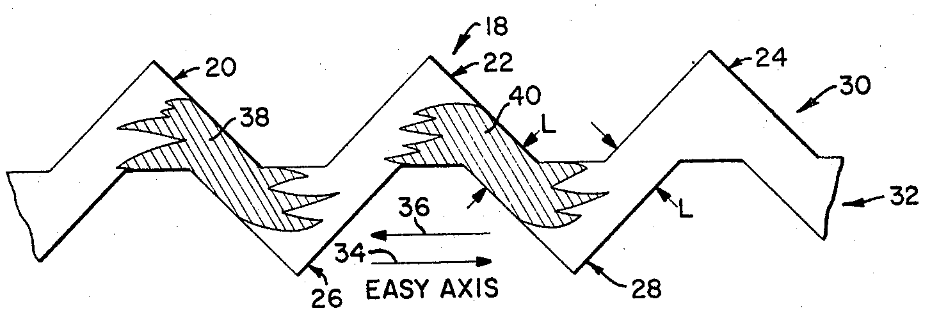
FIGURE 3 is a pictorial view of the consecutive magnetic storage sites of FIGURE 2 showing the magnetic domain pattern during propagation thereof in accordance with the invention.

Referring to FIGURES 2 and 3 there is shown a thin film memory 18 of the present invention, utilizing generally the zig-zag or checkerboard configuration of the memory device of the above-mentioned application, Ser. No. 387,426. However, in the present invention the length of the thin film memory 18 lies parallel with the easy axis of magnetization of the magnetic medium forming the memory. As shown in FIGURES 2 and 3 the magnetic storage sites of the invention are also further modified to provide an improved geometry. To this end, the thin film memory 18 is formed of a plurality of magnetic thin film storage sites 20–28 arranged in a multiple row, checkerboard array, in continuous interconnected and zig-zag sequence. The magnetic sites 20–24 are disposed along a first row 30 and the magnetic sites 26–28 are disposed along a second row 32. It is of course within the scope of the invention to have two or more rows and any number of successive magnetic sites in the array to form the magnetic thin film memory 18. Each of the sites 20–28 have a first preferred direction of magnetization such as indicated by arrow 34 and a second preferred direction of magnetization such as indicated by arrow 36. Thus arrow 34 may represent a "1" direction and arrow 36 may designate a "0" direction.

It may be seen that the individual storage sites forming the memory 18 are accordingly disposed in what may be considered an isolated relation. That is, unlike the uninterrupted prior art memory of FIGURE 1, interconnected alternate sites, e.g., 20 and 26 or 26 and 22, are staggered relative to a central line extending between the rows 30, 32 and along the easy axis of magnetization, to provide a physical as well as magnetic isolation between adjacent sites and thus between the respective magnetic domains herein indicated by numerals 38 and 40. Such a configuration provides a memory 18 configuration which inherently precludes the forming of the bridge 16 shown in FIGURE 1. Thus the spacing between magnetic domains 38, 40 is greatly reduced by the invention geometry relative to the spacing between the domains 10 of the FIGURE 1 prior art configuration.

Figure 4:
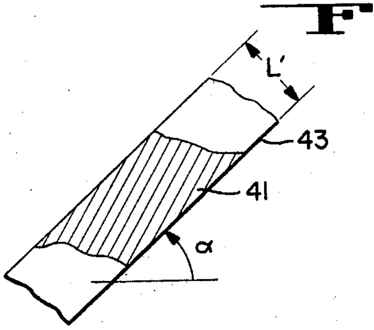
FIGURES 4 and 5 are pictorial views of the domain pattern during storage and propagation thereof respectively, showing the effects of the angle with which the magnetic storage medium is disposed relative to the easy axis thereof.
Figure 5:
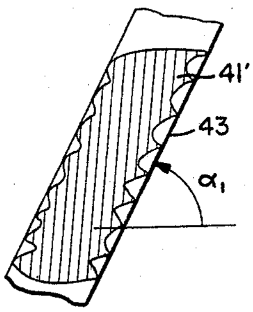
Figure 6:
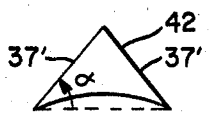
FIGURES 6–12 are simplified pictorial views showing various shapes of elements which may be utilized to form the zig-zag memory in accordance with the present invention.
Figure 7:
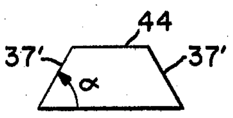
Figure 8:
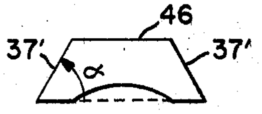
Figure 9:
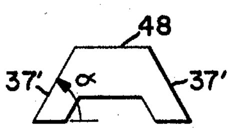
Figure 10:
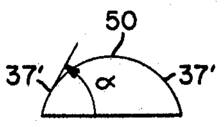
Figure 11:
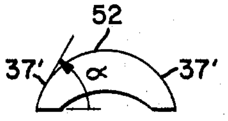

As exemplified in FIGURES 2 and 3 the magnetic sites 20–28 comprise generally a triangular shape wherein the base of one site overlaps the adjacent bases of adjoining sites. The maximum amount of overlap accordingly, would be one-half of the site base length. It has been found that there exists an angle $\alpha$, that the boundary or sides of the site may have with respect to the direction of the easy axis of the thin film memory 18 which, along with the site geometry, determines the stability of the magnetic domains. That is, in accordance with the invention, if the sides of the magnetic sites 20–28, indicated herein by numeral 37, are slanted at an angle shallower than $\alpha$ the magnetic domains 38, 40 within sites 20 and 22 respectively, will not tend to form zig-zag walls as in the prior art memory of FIGURE 1. However, if the angle of the sides of the sites 20–28 exceed the angle $\alpha$, the domain walls will again break up to form the zig-zag wall pattern. The breaking up of the domain walls is determined by the tendency of the magnetic domain to achieve a minimized magnetostatic energy state. Whether or not the minimized magnetostatic energy state is reached without the domain walls breaking up into zig-zig walls is thus generally dependent upon the angle $\alpha$, the geometrical dimensions of the site, the degree of overlap of the site bases and the thickness and the material properties of the magnetic film of which the sites are formed. Thus, the angle $\alpha$ is in turn a complex function of the site geometry, overlap and thickness and type of material. The effect of the angle $\alpha$ is further shown in FIGURES 4 and 5 wherein FIGURE 4 shows the lack of zig-zag walls and FIGURE 5 shows the formation of zig-zag walls on a magnetic domain

41', where a magnetic thin film strip 43 is disposed at an angle $\alpha_1$ greater than the angle $\alpha$ relative to the easy axis of the strip. In addition, a width, L, of the interconnecting portions of the sites (FIGURE 3) as well as a width L' of the strip 43 (FIGURE 4) or any like storage strip, partially determines the ease with which zig-zag walls are formed, along with the angle of the sides. That is, a smaller value of L or L' would allow the use of a greater angle $\alpha$ before the formation of zig-zag walls would occur.

Accordingly, the individual configuration as well as the combined geometry of the magnetic sites 20–23 of FIGURES 2 and 3 provides the advantage of preventing the occurrence of interference between consecutive domains 38, 40, due to the presence of zig-zag walls, by preventing the formation of the zig-zag walls themselves. Thus, as shown in FIGURE 2 there are no zig-zag walls present during information storage within the memory 18. During propagation of the domains 38, 40, as shown in FIGURE 3, the domain walls do tend to break up to define zig-zag walls therein. However, the formation of zig-zag walls during propagation of the domains is immaterial since the memory system operates on the theory that it is easier to move existing domain walls than it is to create new ones.

It is to be understood that although it is preferable to provide a memory 18 of a configuration which precludes the formation of zig-zag walls in the stored magnetic domains, the memory 18 will operate satisfactorily even though such zig-zag walls exist. However, a memory of improved operation is afforded by selecting the site geometry and overall memory configuration which precludes entirely the formation of the zig-zag walls when the magnetic domains are in storage.

Figure 12:
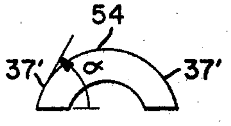

Referring now to FIGURES 6–12, there are shown a number of different shapes for magnetic sites which may be utilized to replace the triangular configuration of the magnetic sites 20–28 shown in FIGURES 2 and 3. By way of example only, the shapes of the magnetic sites of FIGURES 6–12 may thus comprise a triangular site having an arcuate base (FIGURE 6), a trapezoidal magnetic site 44 (FIGURE 7), a trapezoidal magnetic site 46 having an arcuate base portion (FIGURE 8), a truncated triangular magnetic site 48 having a cut-out trapezoidal portion formed in the base thereof (FIGURE 9), a semi-arcuate magnetic site 50 (FIGURE 10), a semi-arcuate magnetic site 52 having an arcuate base therein (FIGURE 11), and a semi-arcuate magnetic site 54 having an arcuate base and defining generally a semi-ring shape (FIGURE 12). It is noted that in all the shapes shown in FIGURES 6–12 the angle $\alpha$, is one factor in the formation of the magnetic sites. That is, as previously mentioned, improved operation is afforded by the invention if the sides 37' of the sites are formed with an angle shallower than the angle $\alpha$ with respect to the base; viz., with respect to the easy axis of magnetization.

As shown in FIGURE 2, the magnetic domains 38, 40 behave similarly to a membrane in a viscous medium, and accordingly are gently rounded close to the tip of their respective magnetic sites at a point opposite the bases thereof. The smaller the sites are made the more pronounced this effect is. Since this effect helps to inhibit the breaking up of straight domain walls into undesirable zig-zag walls as noted above with respect to the width L, decreasing the dimensions of the site tends to affect the angle $\alpha$, viz., to allow the use of a somewhat larger angle while still inhibiting the formation of zig-zag walls. Since increasing the angle would provide steeper sides 37 and thus would compress the length of the memory 18 and allow a greater packing density, it generally is preferable to increase the amount of base overlap, while increasing the value of $\alpha$ to a maximum, without causing the generation of zig-zag walls in the magnetic domains 38, 40.

Figure 13:
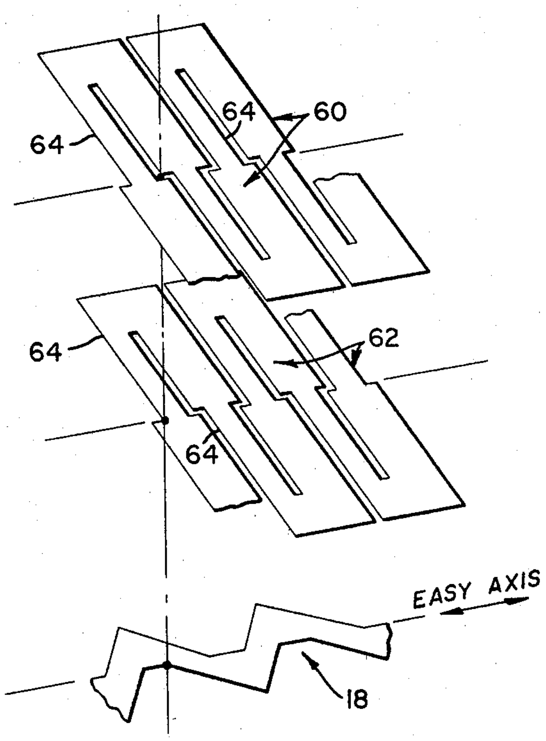
FIGURES 13 and 14 are simplified pictorial views of composite memory arrays exemplifying memory configurations, and associated conductor configurations which may be utilized to energize the memories in accordance with the present invention.

FIGURE 13 shows a portion of a conductor configuration which exemplifies conductor means which may be used to propagate the magnetic domains in the thin film memory 18 of the invention. The conductor means comprises a serially connected, parallel sequence of constricted conductors 60, which generate magnetic field pulses for unidirectionally propagating the domains in the memory 18. A second set of constricted conductors 62 are disposed in staggered, overlapping relation with the conductors 60, whereby the magnetic domains may be propagated unidirectionally in the opposite direction to that instigated by the conductors 60. The applied current to either conductor 60 and/or 62 is balanced such that the domain wall motion threshold is exceeded in a narrow portion 64 of the conductors only. It is to be understood that the manner in which the magnetic domains are propagated is not restricted to the configuration of FIGURE 6, but may utilize any of various conductor systems, including straight conductors without constriction. In addition, the concepts of the conductor systems shown and described in the above-mentioned patent applications Ser. No. 387,426 and Ser. No. 387,427, may be applied. Likewise, read-write means such as described in the applications may be utilized in conjunction with the invention concepts.

Figure 14:
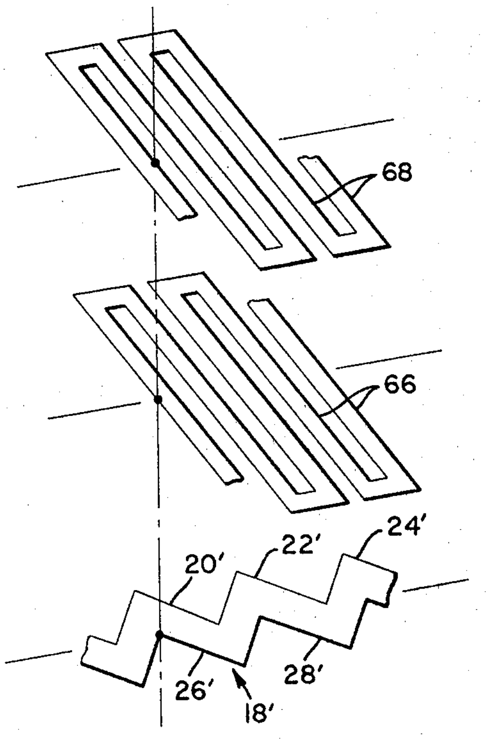

FIGURE 14 shows a thin film memory 18' wherein the overlap between successive sites 20'–28' is made equal to one-half the length of the bases thereof. Accordingly, the bases of the succeeding sites 20', 22' and 24', on the same row, are disposed in abutting relation, and the packing density of the memory 18' is proportionately increased over that of the configuration of FIGURES 2 and 3. Conductor 66 and 68 exemplify a possible conductor array other than the constricted conductors 60, 62 of FIGURE 13, whereby the memory 18' as well as any of the memory configurations shown herein, may be activated to propagate the magnetic domains therein.

The magnetic sites, and in particular the thin film memories 18, 18' of the invention, may be fabricated by any of the usual conventional fabricating methods for forming thin film memory devices. By way of example only, an acceptable method for fabricating the thin film memories would be the method described in the U.S. patent application Ser. No. 508,108 of previous mention.

Although the present invention has been described with respect to several embodiments thereof, it is to be understood that various modifications may be made thereto within the spirit of the invention.

What is claimed is:

1. An improved configuration for magnetic thin film memory devices having write, propagating and read means coupled thereto, the devices including a plurality of successive magnetic thin film elements defining magnetic domain storage sites which are deposited on a substrate means and in a single plane in an alternately staggered array, to define two rows of sites within said single plane having a preferred direction of magnetization in the direction of said rows, comprising;

said sites each having a finite area defined by a base and a boundary of selected geometrical configuration, said boundary including sides which are disposed at a selected angle with respect to the easy axis of magnetization, wherein the site geometrical configuration and the selected angle of the sides provide containment of a magnetic domain which exhibits minimized magnetostatic energy, and wherein the bases of successive adjacent sites are overlapped within said single plane to define therebetween integral interconnecting portions of selected width.

2. The improved configuration of claim 1 wherein said geometrical boundary configuration comprises at least two sides which extend from said base of each site within the single plane and are closed at their other ends to define therewithin said finite area for containing respective magnetic domains therein.

3. The improved configuration of claim 2 wherein the bases overlap an amount ranging from just touching to ½ of the site base lengths within the single plane.

4. The improved configuration of claim 3 wherein the site geometry comprises a generally triangular shape, wherein the bases of alternate successive sites are disposed in overlapping relation within the single plane.

5. The improved configuration of claim 4 wherein the apexes of said triangular shaped sites opposite the bases thereof are truncated to define truncated triangular shaped sites.

6. The improved configuration of claim 4 wherein the triangular shaped sites have a selected portion removed from the central region of the bases thereof.

7. The improved configuration of claim 3 wherein the site geometry comprises a semi-arcuate shape having a boundary of preselected curvature.

8. The improved configuration of claim 7 wherein the semi-arcuate shaped sites have a selected portion removed from the central region of the bases thereof.

References Cited

UNITED STATES PATENTS

| | | | |
|---|---|---|---|
| 3,417,385 | 12/1968 | Wolf | 340—174 |
| 3,427,603 | 2/1969 | Wolf et al. | 340—174 |
| 3,230,515 | 1/1966 | Smaller | 340—174 |
| 3,248,713 | 4/1966 | Middlehoek | 340—174 |

STANLEY M. URYNOWICZ, Jr., Primary Examiner